United States Patent
Xian et al.

(10) Patent No.: US 11,343,347 B2
(45) Date of Patent: May 24, 2022

(54) RELAY DEVICE, RELAY METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuanjun Xian, Yokkaichi (JP); Makoto Mashita, Yokkaichi (JP); Takeshi Hagihara, Yokkaichi (JP); Ichiro Kanda, Osaka (JP); Akihito Iwata, Osaka (JP); Takehiro Kawauchi, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/273,069

(22) PCT Filed: Aug. 21, 2019

(86) PCT No.: PCT/JP2019/032567
§ 371 (c)(1),
(2) Date: Mar. 3, 2021

(87) PCT Pub. No.: WO2020/050021
PCT Pub. Date: Mar. 12, 2020

(65) Prior Publication Data
US 2021/0344773 A1    Nov. 4, 2021

(30) Foreign Application Priority Data

Sep. 3, 2018 (JP) .............................. JP2018-164661

(51) Int. Cl.
*H04L 67/568* (2022.01)

(52) U.S. Cl.
CPC .............................. *H04L 67/2842* (2013.01)

(58) Field of Classification Search
CPC ..... H04L 67/00–67/42; H04L 41/00–41/5096; H04L 47/00–47/829
See application file for complete search history.

(56) References Cited

U.S. PATENT DOCUMENTS

2005/0188109 A1* 8/2005 Shiga .................... H04L 47/263
                                                         709/239
2011/0243139 A1   10/2011 Nishimura
(Continued)

FOREIGN PATENT DOCUMENTS

| CN | 103763204 A | 4/2014 |
| CN | 104052676 A | 9/2014 |

(Continued)

OTHER PUBLICATIONS

International Search Report, Application No. PCT/JP2019/032567 dated Nov. 5, 2019. ISA/Japan Patent Office.

*Primary Examiner* — Clayton R Williams
(74) *Attorney, Agent, or Firm* — Honigman LLP

(57) ABSTRACT

In a relay device, a control unit stores, in a temporary storage unit data which is received by an Ethernet communication unit through a communication line. When the data stored in the temporary storage unit is transmitted, the control unit deletes the transmitted data from the temporary storage unit. When the control unit determines that, for the data received by the Ethernet communication unit, the amount of data stored in the temporary storage unit is equal to or greater than a threshold value, the Ethernet communication unit transmits instruction data giving an instruction to stop (Continued)

transmission through a communication line and to perform transmission through a communication bus.

19 Claims, 8 Drawing Sheets

(56) References Cited

U.S. PATENT DOCUMENTS

2015/0365332 A1 12/2015 You et al.
2019/0089623 A1* 3/2019 Dion .................. H04N 21/6118

FOREIGN PATENT DOCUMENTS

| | | |
|---|---|---|
| JP | 2011211530 A | 10/2011 |
| JP | 2011-223155 A | 11/2011 |
| JP | 2016-51916 A | 4/2016 |
| WO | 2012-066628 A1 | 5/2012 |

* cited by examiner

FIG. 12
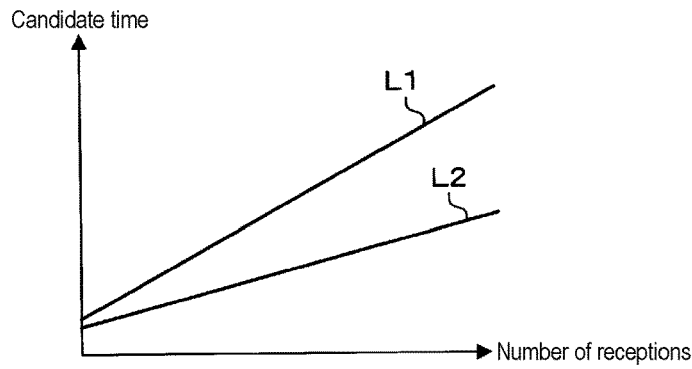
FIG. 13
| Data | Device for transmitting data |
|---|---|
| First application data | High-performance ECU 10 |
| Second application data | High-performance ECU 20 |
FIG. 14
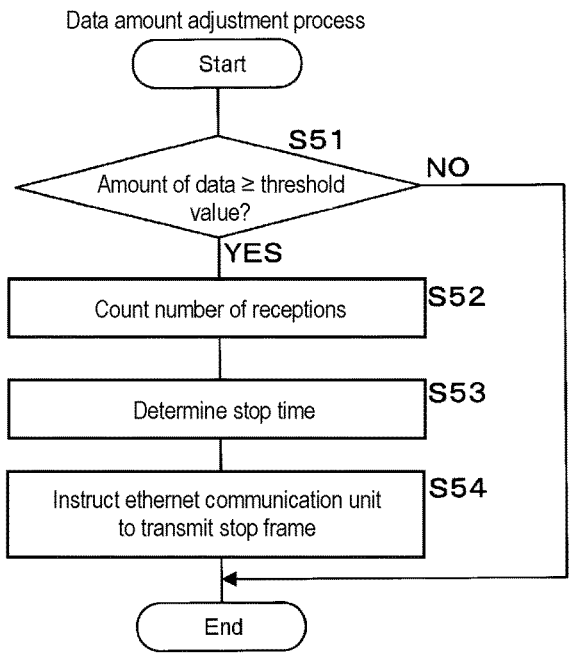
FIG. 15
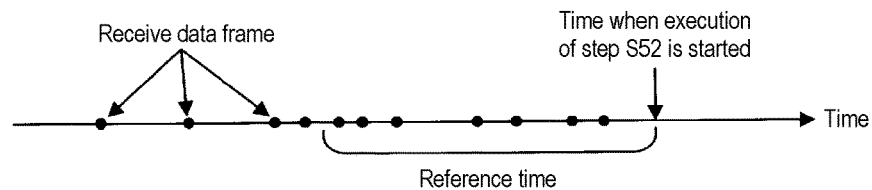

RELAY DEVICE, RELAY METHOD, AND COMPUTER PROGRAM

CROSS-REFERENCE TO RELATED APPLICATIONS

This application is the U.S. national stage of PCT/JP2019/032567 filed on Aug. 21, 2019, which claims priority of Japanese Patent Application No. JP 2018-164661 filed on Sep. 3, 2018, the contents of which are incorporated herein.

TECHNICAL FIELD

The present disclosure relates to a relay device, a relay method, and a computer program.

BACKGROUND

Japanese Patent Laid-Open Publication No. 2016-51916 discloses a communication system for a vehicle in which a relay device relays communication between two communication devices. In this communication system, the relay device is connected to one end of each of two communication lines. The other ends of the two communication lines are connected to the two communication devices, respectively. The relay device receives data from one communication device through the communication line. The relay device transmits the received data to the other communication device through the communication line. In communication through two communication lines, a protocol for Ethernet (registered trademark) is used.

In a conventional relay device that relays communication using a protocol for Ethernet, data received through one of the two communication lines is stored in a storage unit. The data stored in the storage unit is transmitted through the other communication line. In the conventional relay device, when data is transmitted, the transmitted data is deleted from the storage unit. The amount of data stored in the storage unit changes according to the amount of data received per unit time and according to the amount of data transmitted per unit time.

In the conventional relay device, when the amount of data stored in the storage unit becomes a value close to the upper limit value, data that gives an instruction to stop the transmission is transmitted to the communication device which is a transmission source of data. The communication device stops the transmission of data until the amount of data is reduced to a small value.

When the conventional relay device transmits, to the communication device, instruction data which gives an instruction to stop transmission, it takes a long time to transmit the data from the communication device as a transmission source to the communication device as a transmission destination. In this case, in the communication device as a transmission destination, processing based on the data received from the communication device as a transmission source may not be performed at an appropriate timing.

For example, it is assumed that the communication device is configured to transmit data giving an instruction to open the window when the occupant of a vehicle operates an operation unit. When the communication device as a transmission source is instructed to stop the transmission at the point in time when the occupant operates the operation unit, the communication device waits without transmitting data until the amount of data in the storage unit is reduced to a small value. For this reason, it takes a long time to open the window, which may make the occupant feel uncomfortable.

Therefore, it is an object to provide a relay device, a relay method, and a computer program capable of realizing the transmission of data in a short time.

SUMMARY

A relay device according to an aspect of the present disclosure receives data from a communication device through a first communication path or a second communication path and transmits the received data. The relay device includes: a storage unit in which the data received through the first communication path is stored; a first transmission unit that transmits the data stored in the storage unit; a deletion unit that deletes, from the storage unit, the data transmitted by the first transmission unit; a data amount determination unit that determines, for the data received through the first communication path, whether or not an amount of data stored in the storage unit is equal to or greater than a threshold value; and a second transmission unit that transmits, to the communication device, instruction data which gives an instruction to stop transmission through the first communication path and to perform transmission through the second communication path, when the data amount determination unit determines that the amount of data is equal to or greater than the threshold value.

A relay method according to an aspect of the present disclosure includes: storing, in a storage unit, data which is received from a communication device through a first communication path; transmitting the data stored in the storage unit; deleting the transmitted data from the storage unit; determining, for the data received through the first communication path, whether or not an amount of data stored in the storage unit is equal to or greater than a threshold value; and transmitting, to the communication device, instruction data which gives an instruction to stop transmission through the first communication path and to perform transmission through a second communication path different from the first communication path, when it is determined that the amount of data is equal to or greater than the threshold value.

A computer program according to an aspect of the present disclosure causes a computer to execute: storing, in a storage unit, data which is received from a communication device through a first communication path; giving an instruction to transmit the data stored in the storage unit; deleting the transmitted data from the storage unit; determining, for the data received through the first communication path, whether or not an amount of data stored in the storage unit is equal to or greater than a threshold value; and giving an instruction to transmit, to the communication device, instruction data which gives an instruction to stop transmission through the first communication path and to perform transmission through a second communication path different from the first communication path, when it is determined that the amount of data is equal to or greater than the threshold value.

Not only can the present disclosure be realized as a relay device including such characteristic processing units, but also the present disclosure can be realized as a relay method including such characteristic processes as steps or can be realized as a computer program causing a computer to execute such steps. In addition, the present disclosure can be realized as a semiconductor integrated circuit that realizes a part or the entirety of a relay device, or can be realized as a communication system including a relay device.

First, embodiments of the present disclosure will be listed and described. At least some of the embodiments described below may be arbitrarily combined.

A relay device according to an aspect of the present disclosure receives data from a communication device through a first communication path or a second communication path and transmits the received data. The relay device includes: a storage unit in which the data received through the first communication path is stored; a first transmission unit that transmits the data stored in the storage unit; a deletion unit that deletes, from the storage unit, the data transmitted by the first transmission unit; a data amount determination unit that determines, for the data received through the first communication path, whether or not an amount of data stored in the storage unit is equal to or greater than a threshold value; and a second transmission unit that transmits, to the communication device, instruction data which gives an instruction to stop transmission through the first communication path and to perform transmission through the second communication path, when the data amount determination unit determines that the amount of data is equal to or greater than the threshold value.

A relay device according to an aspect of the present disclosure includes a determination unit that determines a stop time, during which the transmission through the first communication path is stopped, based on the number of receptions of data through the first communication path within a predetermined period. The instruction data includes data indicating the stop time determined by the determination unit.

In a relay device according to an aspect of the present disclosure, the number of communication devices is two or more. Data is received from a plurality of the communication devices through a plurality of the first communication paths. A plurality of data received from the plurality of communication devices are stored in the storage unit. The data amount determination unit determines, for each of the plurality of data received respectively from the plurality of communication devices, whether or not the amount of data stored in the storage unit is equal to or greater than a threshold value. When the data amount determination unit determines that the amount of data is equal to or greater than the threshold value for data received from at least one of the plurality of communication devices, the second transmission unit transmits the instruction data to the communication device that is a transmission source of data for which it has been determined that the amount of data is equal to or greater than the threshold value.

In a relay device according to an aspect of the present disclosure, two of a plurality of threshold values for the plurality of data received respectively from the plurality of communication devices are different from each other.

In a relay device according to an aspect of the present disclosure, the number of communication devices is two or more. A plurality of types of data are received from a plurality of the communication devices through a plurality of the first communication paths. The plurality of types of data received through the plurality of first communication paths are stored in the storage unit. The data amount determination unit determines, for each of the plurality of types of data, whether or not the amount of data stored in the storage unit is equal to or greater than a threshold value. When the data amount determination unit determines that the amount of data is equal to or greater than the threshold value for at least one type of data among the plurality of types of data, the second transmission unit transmits the instruction data to the communication device that is a transmission source of data for which it has been determined that the amount of data is equal to or greater than the threshold value.

In a relay device according to an aspect of the present disclosure, the type of data is determined by an application program relevant to a process using the data.

In a relay device according to an aspect of the present disclosure, two of a plurality of threshold values for the plurality of types of data are different from each other.

In a relay device according to an aspect of the present disclosure, the second communication path is a path along which data is transmitted through a communication bus. A protocol used for communication through the first communication path is different from a protocol used for communication through the second communication path.

A relay method according to an aspect of the present disclosure includes: storing, in a storage unit, data which is received from a communication device through a first communication path; transmitting the data stored in the storage unit; deleting the transmitted data from the storage unit; determining, for the data received through the first communication path, whether or not an amount of data stored in the storage unit is equal to or greater than a threshold value; and transmitting, to the communication device, instruction data which gives an instruction to stop transmission through the first communication path and to perform transmission through a second communication path different from the first communication path, when it is determined that the amount of data is equal to or greater than the threshold value.

A computer program according to an aspect of the present disclosure causes a computer to execute: storing, in a storage unit, data which is received from a communication device through a first communication path; giving an instruction to transmit the data stored in the storage unit; deleting the transmitted data from the storage unit; determining, for the data received through the first communication path, whether or not an amount of data stored in the storage unit is equal to or greater than a threshold value; and giving an instruction to transmit, to the communication device, instruction data which gives an instruction to stop transmission through the first communication path and to perform transmission through a second communication path different from the first communication path, when it is determined that the amount of data is equal to or greater than the threshold value.

In the relay device, the relay method, and the computer program according to the aspect described above, when it is determined that the amount of data stored in the storage unit is equal to or greater than the threshold value, instruction data is transmitted to the communication device. Therefore, the communication device stops transmission through the first communication path and transmits data through the second communication path. As a result, the transmission of data in a short time is realized.

In the relay device according to the aspect described above, the stop time is appropriately determined based on the number of receptions of data through the first communication path within the predetermined period.

In the relay device according to the aspect described above, the instruction data is transmitted to the communication device that is transmitting data, the amount of which is equal to or greater than the threshold value, among the plurality of communication devices. As a result, the communication device transmitting a large amount of data stops transmission through the first communication path and transmits data through the second communication path. For this reason, data is efficiently transmitted.

In the relay device according to the aspect described above, all the threshold values for a plurality of data received from the plurality of communication devices are not the same. All the threshold values are appropriately set separately.

In the relay device according to the aspect described above, a plurality of types of data are relayed. When the amount of data stored in the storage unit is large for one type of data, the instruction data is transmitted to the communication device that is a transmission source of the type of data. As a result, for the type of data, the amount of which amount is large, transmission through the first communication path is stopped, and transmission through the second communication path is performed. For this reason, a plurality of types of data are efficiently transmitted.

In the relay device according to the aspect described above, the data used in the process relevant to one application program is one type of data.

In the relay device according to the aspect described above, all the threshold values for a plurality of types of data are not the same. All the threshold values are appropriately set.

In the relay device according to the aspect described above, in the communication through the first communication path, for example, a protocol for Ethernet is used. In the communication through the second communication path, for example, a protocol for CAN is used.

Advantageous Effects of the Disclosure

According to the present disclosure, it is possible to realize the transmission of data in a short time.

BRIEF DESCRIPTION OF THE DRAWINGS

FIG. 12 is an explanatory diagram of a candidate time for a high-performance ECU.

FIG. 13 is a chart showing an example of the relationship between data and a device for transmitting the data in Embodiment 2.

FIG. 14 is a flowchart showing the procedure of a data amount adjustment process.

FIG. 15 is an explanatory diagram of the number of receptions relevant to first application data.

DETAILED DESCRIPTION OF PREFERRED EMBODIMENTS

Specific examples of communication systems according to embodiments of the present disclosure will be described below with reference to the diagrams. In addition, the present disclosure is not limited to these examples but is defined by the claims, and is intended to include all modifications within the meaning and scope equivalent to the claims.

Embodiment 1

Figure 1:
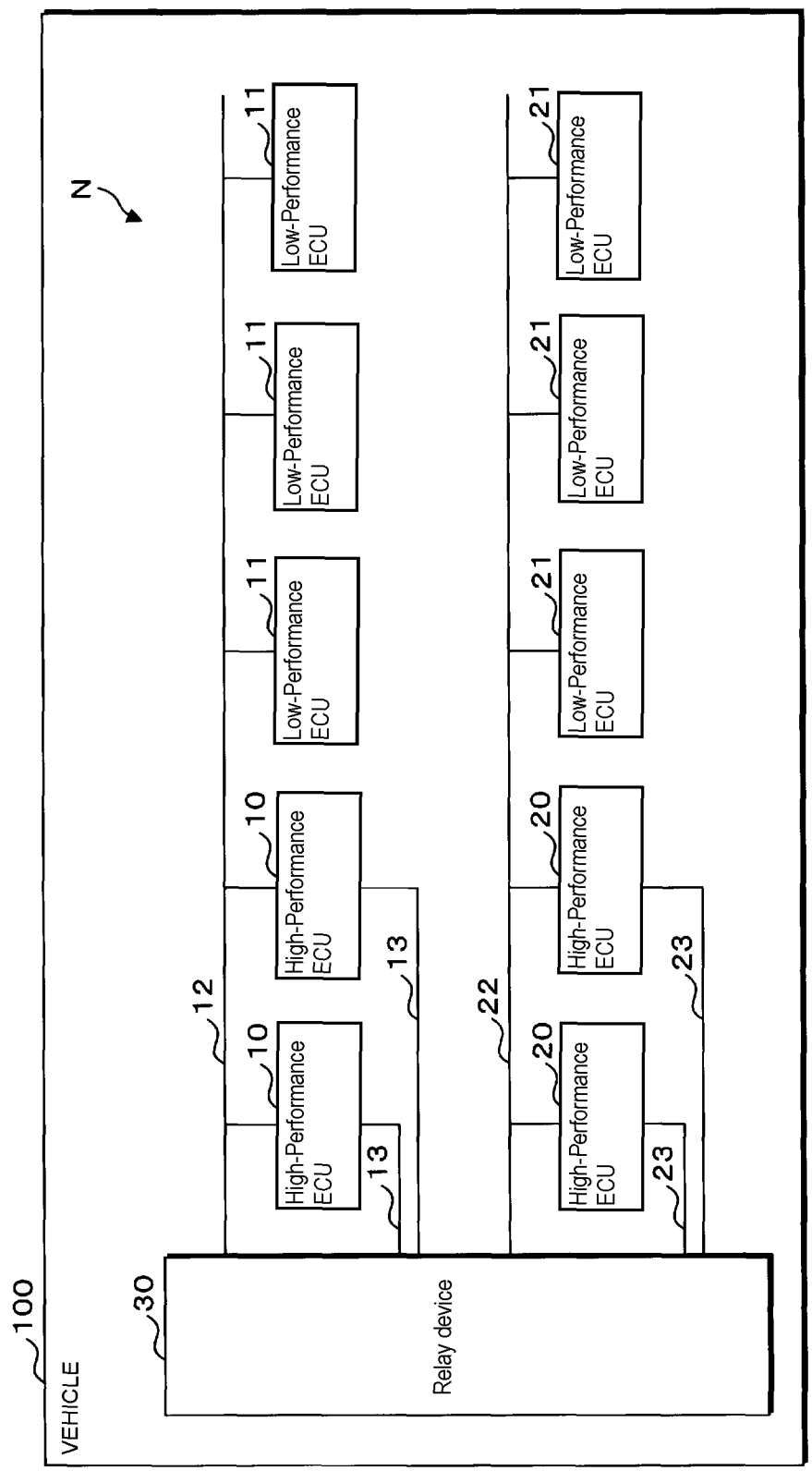
FIG. 1 is a block diagram showing the main configuration of a communication system according to Embodiment 1.

FIG. 1 is a block diagram showing the main configuration of a communication system N according to Embodiment 1. The communication system N is preferably mounted in a vehicle 100. The communication system N includes four high-performance ECUs (Electronic Control Units) 10 and 20, six low-performance ECUs 11 and 21, two communication buses 12 and 22, four communication lines 13 and 23, and a relay device 30.

The two high-performance ECUs 10 and the three low-performance ECUs 11 are connected to the communication bus 12. Each of the two high-performance ECUs 10 is further connected to the communication line 13. Similarly, the two high-performance ECUs 20 and the three low-performance ECUs 21 are connected to the communication bus 22. Each of the two high-performance ECUs 20 is further connected to the communication line 23. The relay device 30 is separately connected to the two communication buses 12 and 22 and the four communication lines 13 and 23.

Each of the high-performance ECUs 10 and 20 and the low-performance ECUs 11 and 21 performs control related to an electric device mounted in the vehicle 100. The high-performance ECUs 10 and 20 and the low-performance ECUs 11 and 21 function as communication devices. The four high-performance ECUs 10 and 20 and the six low-performance ECUs 11 and 21 communicate with one another. At least two of these cooperate with one another.

For example, when a person touches the door knob of the vehicle 100, data that gives an instruction to unlock the door is input to one low-performance ECU 11. The low-performance ECU 11 transmits the input data to one high-performance ECU 20. When the high-performance ECU 20 receives the data giving an instruction to unlock the door, the high-performance ECU 20 outputs the received data to a drive machine that drives a door motor for unlocking the door. As a result, the door is unlocked.

The relay device 30 transmits the data to at least one of the four high-performance ECUs 10 and 20 and the three low-performance ECUs 11, the data being received from one of the two high-performance ECUs 20 and the three low-performance ECUs 21. Similarly, the relay device 30 transmits the data to at least one of the four high-performance ECUs 10 and 20 and the three low-performance ECUs 21, the data being received from one of the two high-performance ECUs 10 and the three low-performance ECUs 11.

In the communication system N, main data is transmitted by transmitting a data frame including the main data indicating the content of which the device as a transmission destination is to be notified. The main data is, for example, data that gives an instruction to unlock the door. The data frame includes various kinds of sub-data in addition to the main data.

In communication through the communication buses 12 and 22, a protocol for CAN (Controller Area Network) is used. The data frame for CAN includes, as sub data, identification data for identifying the main data. Each of the communication buses 12 and 22 is a twisted pair cable.

The high-performance ECU 10, the low-performance ECU 11, and the relay device 30 transmit a data frame for CAN through the communication bus 12. The data frame transmitted through the communication bus 12 by one device is received by all the devices connected to the communication bus 12. Similarly, the high-performance ECU 20, the low-performance ECU 21, and the relay device 30 transmit a data frame for CAN through the communication bus 22. The data frame transmitted through the communication bus 22 by one device is received by all the devices connected to the communication bus 22.

When the device connected to the communication bus 12 receives the data frame, the device determines whether or not the received data frame is to be stored based on the identification data included in the received data frame. When it is determined that the received data frame is to be stored, the device stores the received data frame. Similarly, when the device connected to the communication bus 22 receives the data frame, the device determines whether or not the received data frame is to be stored based on the identification data included in the received data frame. When it is determined that the received data frame is to be stored, the device stores the received data frame.

Each of the high-performance ECU 10 and the low-performance ECU 11 performs control related to an electric device based on the main data of the data frame stored after being received through the communication bus 12. Similarly, each of the high-performance ECU 20 and the low-performance ECU 21 performs control related to an electric device based on the main data of the data frame stored after being received through the communication bus 22. The relay device 30 transmits the data frame through the communication bus 22, the data frame being stored after being received through the communication bus 12. The relay device 30 transmits the data frame through the communication bus 12, the data fame being stored after being received through the communication bus 22. The path along which the data frame is transmitted through each of the communication buses 12 and 22 corresponds to a second communication path.

In each of communications through the communication lines 13 and 23, a protocol for Ethernet is used. Therefore, the protocol used for communications through the communication lines 13 and 23 is different from the protocol used for communications through the communication buses 12 and 22. The communication through each of the communication lines 13 and 23 is one-to-one communication. Therefore, the number of devices connected to each of the communication lines 13 and 23 is two. In the each of communications through the communication lines 13 and 23, a stop frame is used in addition to the data frame. The stop frame gives an instruction to stop transmission through the communication line 13 or 23 and to perform transmission through the communication bus 12 or 22. The stop frame corresponds to instruction data.

Figure 2:
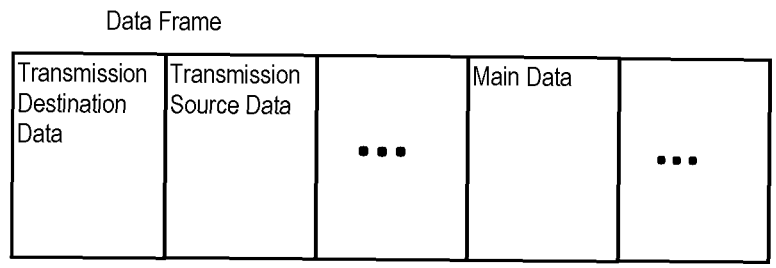
FIG. 2 is an explanatory diagram of a data frame and a stop frame.
Figure 2:
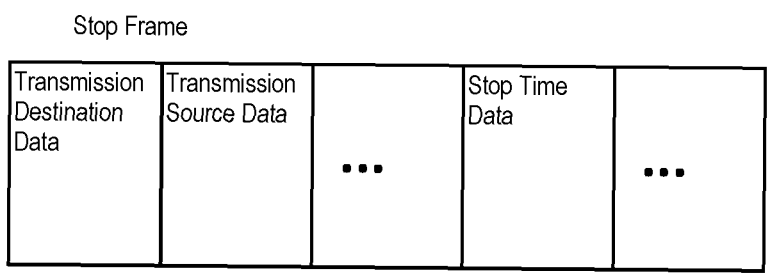

FIG. 2 is an explanatory diagram of a data frame and a stop frame. FIG. 2 shows a data frame for Ethernet. As shown in FIG. 2, each of the data frame and the stop frame includes transmission destination data and transmission source data. The transmission destination data indicates a device as a transmission destination. The transmission source data indicates a device as a transmission source. The data frame further includes main data. The stop frame further includes stop time data indicating the stop time during which transmission through the communication line 13 or 23 is stopped.

The high-performance ECUs 10 and 20 transmit data frames to the relay device 30 through the communication lines 13 and 23, respectively. The relay device 30 receives the data frames from the four high-performance ECUs 10 and 20 through the communication lines 13 and 23. The relay device 30 stores the data frames received through the communication lines 13 and 23. The relay device 30 transmits the data frame to one of the four high-performance ECUs 10 and 20 through one of the four communication lines 13 and 23, the data frame being stored after being received through the communication line 13 or 23. The path along which the data frame is transmitted through each of the four communication lines 13 and 23 corresponds to a first communication path. The number of first communication paths is four.

The high-performance ECUs 10 and 20 store data frames received through the communication lines 13 and 23, respectively. The high-performance ECUs 10 and 20 perform controls related to electric devices based on the main data of the data frame stored after being received through the communication lines 13 and 23, respectively.

The high-performance ECUs 10 and 20 transmit data frames for CAN through the communication buses 12 and 22, respectively, when the device as a transmission destination is one of the six low-performance ECUs 11 and 21.

When the transmission destination is one of the four high-performance ECUs 10 and 20, the high-performance ECUs 10 and 20 normally transmit data frames for Ethernet through the communication lines 13 and 23, respectively. When each of the high-performance ECUs 10 and 20 receives a stop frame from the relay device 30, each of the high-performance ECUs 10 and 20 stops the transmission of the data frame through the communication line 13 or 23 during the stop time indicated by the stop time data of the received stop frame. While the high-performance ECUs 10 and 20 stop the transmission of the data frame through the communication lines 13 and 23, respectively, the high-performance ECUs 10 and 20 transmit data frames for CAN to a high-performance ECU different from its own device, among the four high-performance ECUs 10 and 20, through the communication buses 12 and 22, respectively.

The high-performance ECUs 10 and 20 resume transmission through the communication lines 13 and 23, respectively, when the stop time passes from the reception of the stop frame. That is, the high-performance ECUs 10 and 20 transmit a data frame for Ethernet through the communication lines 13 and 23, respectively, when the transmission destination is one of the four high-performance ECUs 10 and 20. The communication speed of communication through each of the communication lines 13 and 23 is, for example, 100 Mbps. The communication speed of communication through each of the communication buses 12 and 22 is, for example, 1 Mbps. The communication speed of communication through each of the communication buses 12 and 22 is slower than the communication speed of communication through each of the communication lines 13 and 23.

Figure 3:
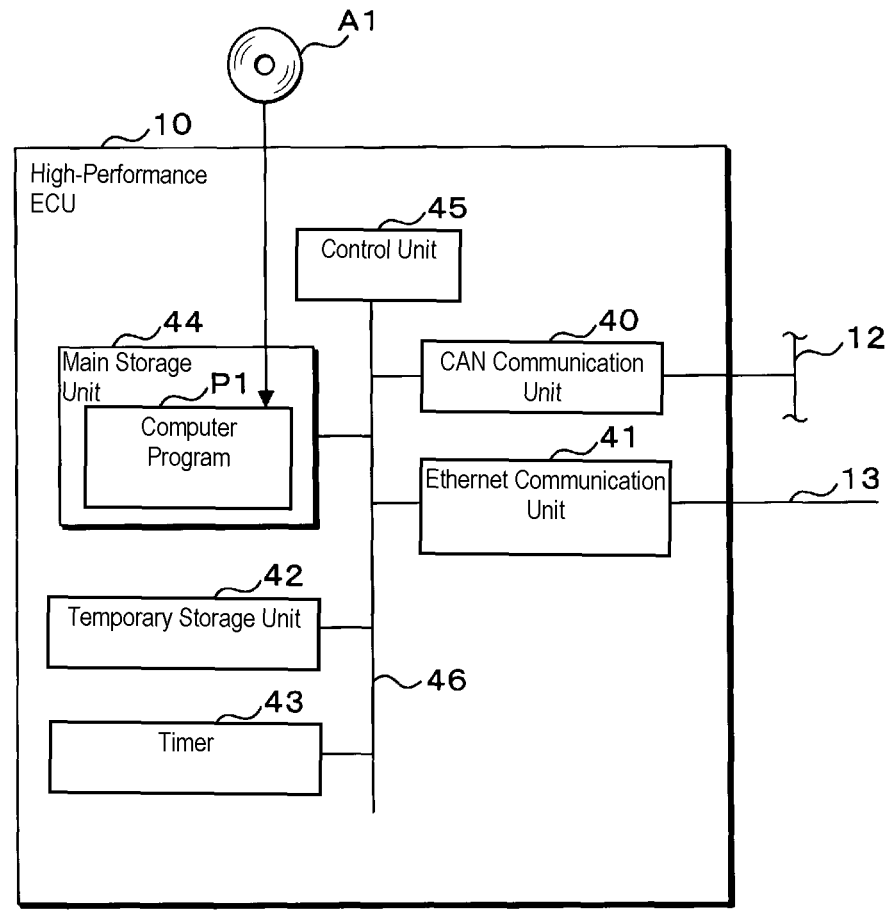
FIG. 3 is a block diagram showing the main configuration of a high-performance ECU.

Hereinafter, the specific configurations of the high-performance ECUs 10 and 20 and the relay device 30 will be described. FIG. 3 is a block diagram showing the main configuration of the high-performance ECU 10. The high-performance ECU 10 includes a CAN communication unit 40, an Ethernet communication unit 41, a temporary storage unit 42, a timer 43, a main storage unit 44, and a control unit 45. These are connected to an internal bus 46 in the high-performance ECU 10. The CAN communication unit 40 is further connected to the communication bus 12. The Ethernet communication unit 41 is further connected to the communication line 13.

Each of the CAN communication unit 40 and the Ethernet communication unit 41 is an interface. Each of the CAN communication unit 40 and the Ethernet communication unit 41 transmits a data frame according to the instruction of the control unit 45. The CAN communication unit 40 receives all the data frames transmitted through the communication bus 12. The Ethernet communication unit 41 receives the data frame transmitted from the relay device 30 through the communication line 13. The control unit 45 acquires the data frames received by the CAN communication unit 40 and the Ethernet communication unit 41 from these.

The control unit 45 stores the main data included in the data frames received by the CAN communication unit 40 and the Ethernet communication unit 41 in the temporary storage unit 42 as control data used for performing control related to the electric device. The control unit 45 further stores, in the temporary storage unit 42, transmission data which is to be transmitted to one of the four high-performance ECUs 10 and 20 and the six low-performance ECUs 11 and 21. The control unit 45 reads out the data stored in the temporary storage unit 42 from the temporary storage unit 42. The control unit 45 deletes the data stored in the temporary storage unit 42.

Data is temporarily stored in the temporary storage unit 42. For example, when the supply of power to the temporary storage unit 42 is stopped, all the data stored in the temporary storage unit 42 are deleted.

The timer 43 starts and ends time measurement according to the instruction of the control unit 45. The measurement time measured by the timer 43 is read out by the control unit 45.

The main storage unit 44 is a non-volatile memory. The value of the flag is stored in the main storage unit 44. The control unit 45 changes the value of the flag to 0 or 1. The fact that the value of the flag is 0 indicates that transmission through the communication line 13 is allowed. The fact that the value of the flag is 1 indicates that transmission through the communication line 13 is prohibited.

A computer program P1 is stored in the main storage unit 44. The control unit 45 includes one or more CPUs (Central Processing Units). One or more CPUs included in the control unit 45 execute the computer program P1 to perform a control data storage process, a control process, a transmission data storage process, a flag process, and an ECU-side transmission process in parallel.

The control data storage process and the transmission data storage process are processes for storing control data and transmission data in the temporary storage unit 42, respectively. The control process is a process of performing control related to an electric device based on the control data. The flag process is a process of changing the value of the flag to 0 or 1. The ECU-side transmission process is a process of causing the CAN communication unit 40 or the Ethernet communication unit 41 to transmit a data frame. The computer program P1 is used to cause one or more CPUs of the control unit 45 to execute the control data storage process, the control process, the transmission data storage process, the flag process, and the ECU-side transmission process.

The computer program P1 may be stored in a storage medium A1 so as to be readable by one or more CPUs included in the control unit 45. In this case, the computer program P1 read out from the storage medium A1 by a reader (not shown) is stored in the main storage unit 44. The storage medium A1 is an optical disk, a flexible disk, a magnetic disk, a magnetic optical disk, a semiconductor memory, or the like. The optical disk is a CD (Compact Disc)-ROM (Read Only Memory), a DVD (Digital Versatile Disc)-ROM, a BD (Blu-ray (registered trademark) Disc), or the like. The magnetic disk is, for example, a hard disk. The computer program P1 may be downloaded from an external device (not shown) connected to a communication network (not shown). The downloaded computer program P1 may be stored in the main storage unit 44.

The control unit 45 executes the control data storage process when the CAN communication unit 40 or the Ethernet communication unit 41 receives a data frame. In the control data storage process, when the CAN communication unit 40 receives a data frame, the control unit 45 determines whether or not the main data included in the received data frame is to be stored in the temporary storage unit 42 as control data based on the identification data included in the received data frame.

One or more identification data are stored in the main storage unit 44. When the identification data of the data frame received by the CAN communication unit 40 is included in one or more identification data stored in the main storage unit 44, the control unit 45 determines that the main data included in the received data frame is to be stored in the temporary storage unit 42.

When the identification data of the data frame received by the CAN communication unit 40 is not included in one or more identification data stored in the main storage unit 44, the control unit 45 determines that the main data included in the received data frame is not to be stored in the temporary storage unit 42.

When it is determined that the main data is to be stored, the control unit 45 stores, in the temporary storage unit 42, the main data included in the received data frame as control data. Then, the control unit 45 ends the control data storage process. When it is determined that the main data is not to be stored, the control unit 45 ends the control data storage process without storing, in the temporary storage unit 42, the main data included in the received data frame.

When the Ethernet communication unit 41 receives a data frame, the control unit 45 stores, in the temporary storage unit 42, the main data included in the data frame received by the Ethernet communication unit 41 as control data. Then, the control unit 45 ends the control data storage process.

The control unit 45 performs the control process when control data is stored in the temporary storage unit 42. In the control process, the control unit 45 performs processing based on the control data stored in the temporary storage unit 42. For example, the control unit 45 causes an output unit (not shown) to output data giving an instruction for a specific operation, so that an electric device performs the specific operation. Thereafter, the control unit 45 deletes, from the temporary storage unit 42, the control data relevant to the executed processing. Then, the control unit 45 ends the control process. When other control data are stored in the temporary storage unit 42, the control unit 45 performs the control process again.

The control unit 45 performs the transmission data storage process, for example, when data indicating a sensor detection result, data giving an instruction for a specific operation, or the like is input to an input unit (not shown). In the transmission data storage process, the control unit 45 generates transmission data based on the data input to the input unit. The control unit 45 stores the generated transmission data in the temporary storage unit 42. Thereafter, the control unit 45 ends the transmission data storage process.

Figure 4:
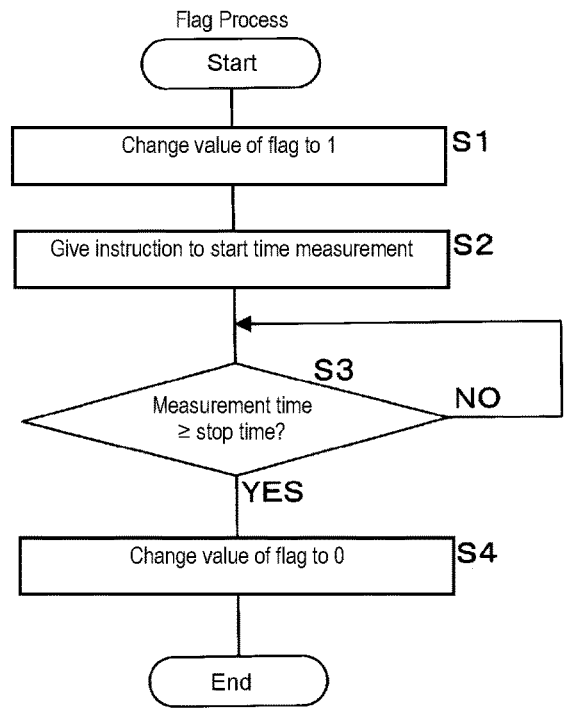
FIG. 4 is a flowchart showing the procedure of a flag process.

FIG. 4 is a flowchart showing the procedure of the flag process. The control unit 45 performs the flag process when the Ethernet communication unit 41 receives a stop frame from the relay device 30. The value of the flag is 0 when the execution of the flag process is started. In the flag process, the control unit 45 changes the value of the flag to 1 (step S1). Then, the control unit 45 instructs the timer 43 to start time measurement (step S2). As a result, the timer 43 starts the time measurement.

Then, the control unit 45 determines whether or not the measurement time measured by the timer 43 is equal to or longer than the stop time indicated by the stop time data of the stop frame received by the Ethernet communication unit 41 (step S3). When it is determined that the measurement time is less than the stop time (S3: NO), the control unit 45 executes step S3 again and waits until the measurement time becomes equal to or longer than the stop time. When it is determined that the measurement time is equal to or longer than the stop time (S3: YES), the control unit 45 changes the value of the flag to 0 (step S4). Then, the control unit 45 ends the flag process.

As described above, in the high-performance ECU 10, the value of the flag is set to 1 until the stop time indicated by the stop time data of the received stop frame passes from the time when the Ethernet communication unit 41 receives the stop frame.

Figure 5:
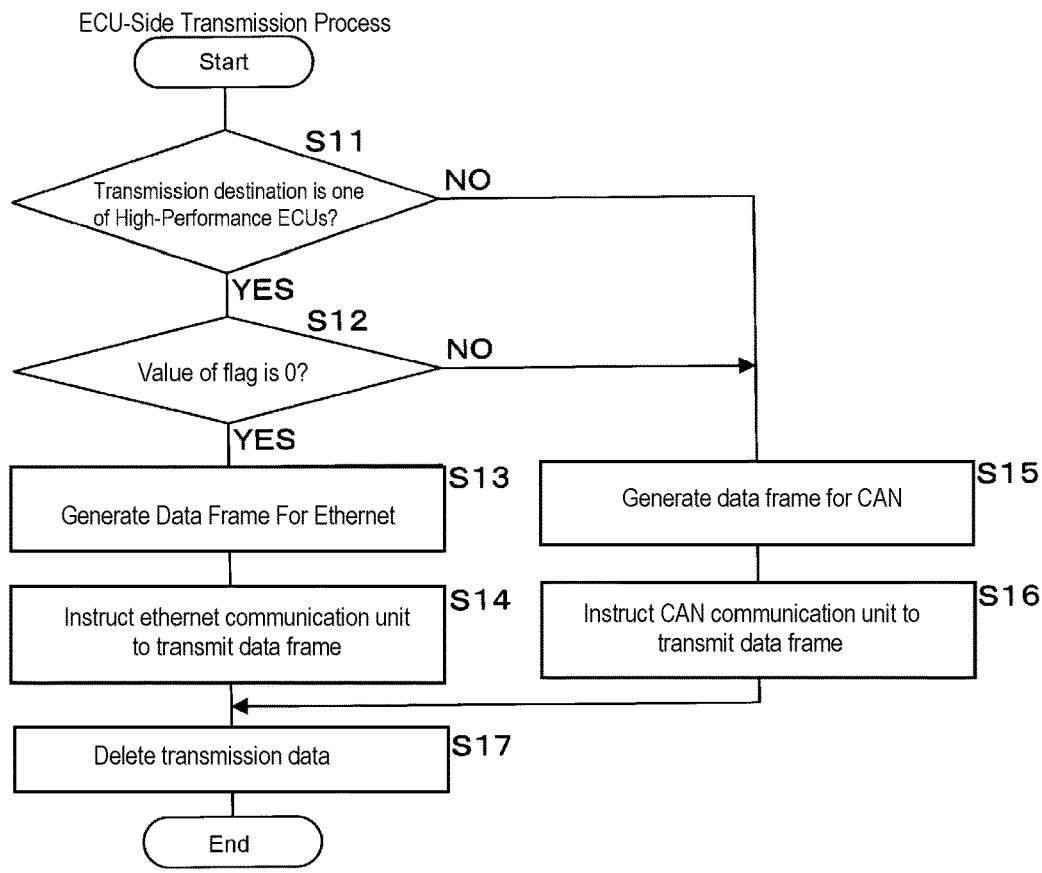
FIG. 5 is a flowchart showing the procedure of an ECU-side transmission process.

FIG. 5 is a flowchart showing the procedure of the ECU-side transmission process. The control unit 45 performs the ECU-side transmission process when the transmission data is stored in the temporary storage unit 42. In the ECU-side transmission process, first, the control unit 45 determines whether or not the transmission destination of the transmission data is one of the three high-performance ECUs 10 and 20 excluding its own device (step S11).

When it is determined that the transmission destination is one of the three high-performance ECUs 10 and 20 (S11: YES), the control unit 45 determines whether or not the value of the flag is 0 (step S12). When it is determined that the value of the flag is 0 (S12: YES), the control unit 45 generates a data frame for Ethernet including transmission data as main data (step S13). Then, the control unit 45 instructs the Ethernet communication unit 41 to transmit the generated data frame (step S14). As a result, the Ethernet communication unit 41 transmits the data frame generated in step S13 to the relay device 30 through the communication line 13.

When it is determined that the transmission destination is not one of the three high-performance ECUs 10 and 20 (S11: NO) or when it is determined that the value of the flag is not 0 (S12: NO), the control unit 45 generates a data frame for CAN including transmission data as main data (step S15). The fact that the transmission destination is not the three high-performance ECUs 10 and 20 means that the transmission destination is one of the six low-performance ECUs 11 and 21. The fact that the value of the flag is not 0 means that the value of the flag is 1.

Then, the control unit 45 instructs the CAN communication unit 40 to transmit the data frame generated in step S15 (step S16). As a result, the CAN communication unit 40 transmits the data frame generated in step S15 through the communication bus 12. After executing one of steps S14 and S16, the control unit 45 deletes, from the temporary storage unit 42, the transmission data included in the transmitted data frame (step S17). Then, the control unit 45 ends the ECU-side transmission process. When another transmission data is stored in the temporary storage unit 42, the control unit 45 performs the ECU-side transmission process again, so that the data frame including the transmission data is transmitted.

As described above, the high-performance ECU 10 stops the transmission of a data frame through the communication line 13 while the value of the flag is 1, that is, until the stop time passes from the time when the Ethernet communication unit 41 receives the stop frame. While the value of the flag is 1, the high-performance ECU 10 transmits, through the communication bus 12 instead of the communication line 13, the transmission data, the transmission destination of which is one of the three high-performance ECUs 10 and 20 excluding its own device.

The high-performance ECU 20 is configured in the similar manner as the high-performance ECU 10. In the description of the configuration of the high-performance ECU 10, the high-performance ECUs 10 and 20, the communication bus 12, and the communication line 13 are replaced with the high-performance ECUs 20 and 10, the communication bus 22, and the communication line 23, respectively. In this manner, it is possible to understand the configuration of the high-performance ECU 20.

Therefore, the high-performance ECU 20 also stops the transmission of a data frame through the communication line 23 while the value of the flag is 1, that is, until the stop time passes from the time when the Ethernet communication unit 41 receives the stop frame. While the value of the flag is 1, the high-performance ECU 20 transmits, through the communication bus 22 instead of the communication line 23, the transmission data, the transmission destination of which is one of the three high-performance ECUs 10 and 20 excluding its own device.

Figure 6:
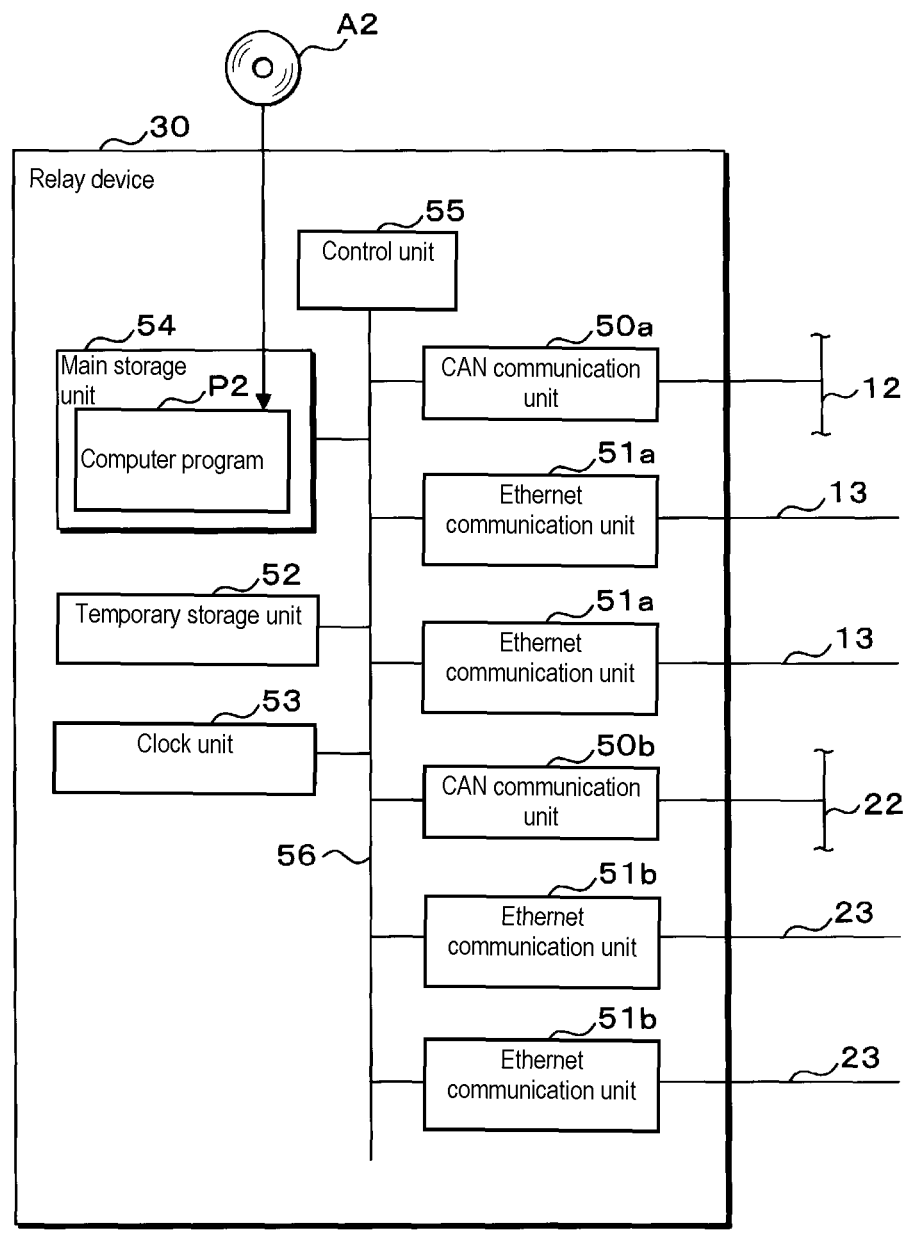
FIG. 6 is a block diagram showing the main configuration of a relay device.

FIG. 6 is a block diagram showing the main configuration of the relay device 30. The relay device 30 includes two CAN communication units 50a and 50b, four Ethernet communication units 51a and 51b, a temporary storage unit 52, a clock unit 53, a main storage unit 54, and a control unit 55. These are connected to an internal bus 56 in the relay device 30. The CAN communication units 50a and 50b are further connected to the communication buses 12 and 22, respectively. Each of the two Ethernet communication units 51a is connected to the communication line 13. Each of the two Ethernet communication units 51b is connected to the communication line 23.

The CAN communication units 50a and 50b and the Ethernet communication units 51a and 51b are interfaces, and transmit data frames according to the instruction of the control unit 55.

The CAN communication unit 50a receives all the data frames transmitted through the communication bus 12. The Ethernet communication unit 51a receives the data frame transmitted from the high-performance ECU 10 through the communication line 13 connected to itself. The CAN communication unit 50b receives all the data frames transmitted through the communication bus 22. The Ethernet communication unit 51b receives the data frame transmitted from the high-performance ECU 20 through the communication line 23 connected to itself. The control unit 55 acquires the data frames received by the CAN communication units 50a and 50b and the Ethernet communication units 51a and 51b from these.

The control unit 55 stores, in the temporary storage unit 52, the data frames received by the two CAN communication units 50a and 50b and the four Ethernet communication units 51a and 51b. The control unit 55 stores reception time data in the temporary storage unit 21. The reception time data indicates: the date and time when the data frame is received by the four Ethernet communication units 51a and 51b; and a device as a transmission source of the received data frame. The device as a transmission source is one of the four high-performance ECUs 10 and 20.

The control unit 55 reads out the data frame and the reception time data stored in the temporary storage unit 52 from the temporary storage unit 52. The control unit 55 deletes the data frame stored in the temporary storage unit 52. Data is temporarily stored in the temporary storage unit 52. For example, when the supply of power to the temporary storage unit 52 is stopped, all the data stored in the temporary storage unit 52 are deleted.

The control unit 55 acquires, from the clock unit 53, date and time data indicating the date and time. The date and time data acquired by the control unit 55 indicates the date and time when the date and time data is acquired.

The main storage unit 54 is a non-volatile memory. A computer program P2 is stored in the main storage unit 54. The control unit 55 includes one or more CPUs. One or more CPUs included in the control unit 55 execute the computer program P2 to perform a device-side storage process, a device-side transmission process, and four data amount adjustment processes corresponding to the four high-performance ECUs 10 and 20 in parallel.

The device-side storage process is a process of storing the data frame in the temporary storage unit 52. The device-side transmission process is a process of transmitting the data frame stored in the temporary storage unit 52. Each of the four data amount adjustment processes is a process of adjusting the amount of data transmitted through the communication line 13 or the communication line 23. The computer program P2 is used to cause one or more CPUs of the control unit 55 to perform the device-side storage process, the device-side transmission process, and the four data amount adjustment processes.

The computer program P2 may be stored in a storage medium A2 so as to be readable by one or more CPUs included in the control unit 55. In this case, the computer program P2 read out from the storage medium A2 by a reader (not shown) is stored in the main storage unit 54. The storage medium A2 is an optical disk, a flexible disk, a magnetic disk, a magnetic optical disk, a semiconductor memory, or the like. The computer program P2 may be downloaded from an external device (not shown) connected to a communication network (not shown). The downloaded computer program P2 may be stored in the main storage unit 54.

Figure 7:
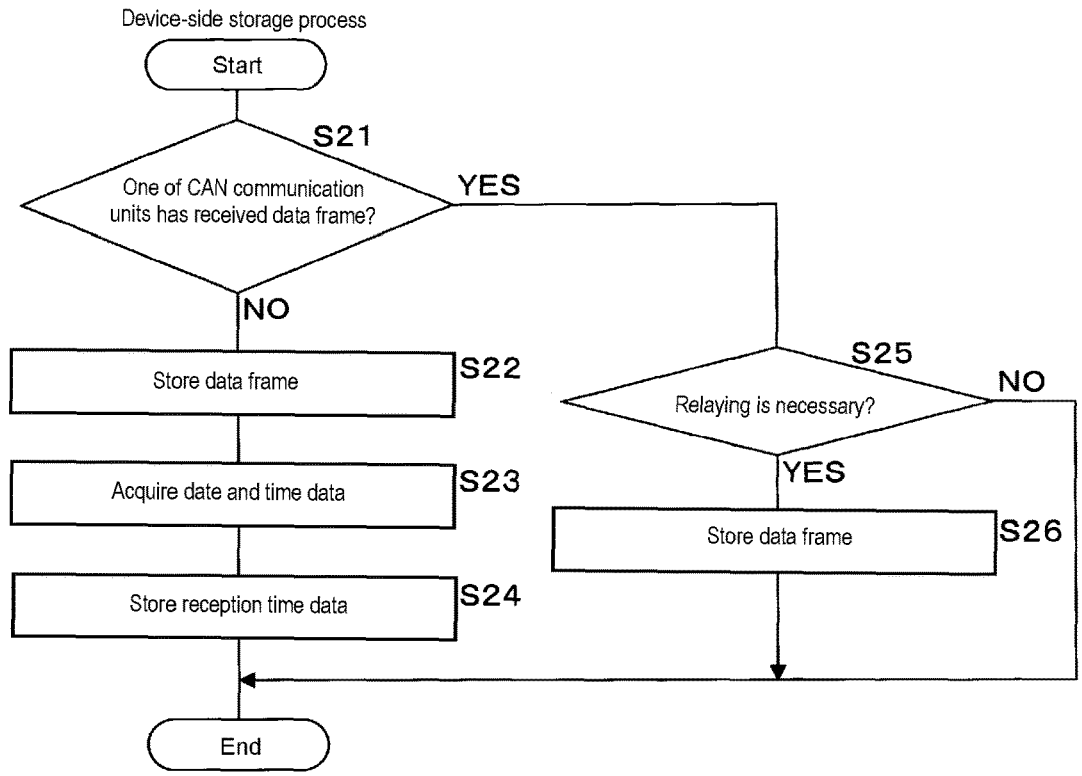
FIG. 7 is a flowchart showing the procedure of a device-side storage process.

FIG. 7 is a flowchart showing the procedure of the device-side storage process. The control unit 55 performs the device-side storage process when one of the two CAN communication units 50a and 50b and the four Ethernet communication units 51a and 51b receives a data frame. In the device-side storage process, first, the control unit 55 determines whether or not one of the two CAN communication units 50a and 50b has received a data frame (step S21). Here, the fact that one of the two CAN communication units 50a and 50b has not received a data frame means that one of the four Ethernet communication units 51a and 51b has received a data frame.

When it is determined that one of the two CAN communication units 50a and 50b has not received a data frame (S21: NO), the control unit 55 stores, in the temporary storage unit 52, a data frame received by one of the four Ethernet communication units 51a and 51b (step S22). Then, the control unit 55 acquires date and time data from the clock unit 53 (step S23), and stores the reception time data in the temporary storage unit 52 (step S24). The reception time data indicates: a device as a transmission source indicated by the transmission source data of the received data frame; and the date and time indicated by the date and time data acquired in step S23.

When it is determined that one of the two CAN communication units 50a and 50b has received a data frame (S21: YES), the control unit 55 determines whether or not it is necessary to relay the data frame received by one of the two CAN communication units 50a and 50b (step S25).

One or more identification data are stored in the main storage unit 54. In step S25, the control unit 55 determines that relaying is necessary when the identification data of the data frame received by one of the two CAN communication units 50a and 50b is included in one or more identification data stored in the main storage unit 54. The control unit 55 determines that relaying is not necessary when the identification data of the data frame received by one of the two CAN communication units 50a and 50b is not included in one or more identification data stored in the main storage unit 54.

When it is determined that relaying is necessary (S25: YES), the control unit 55 stores, in the temporary storage unit 52, the data frame received by one of the CAN communication units 50a and 50b (step S26). After executing one of steps S24 and S26 or when it is determined that relaying is not necessary (S25: NO), the control unit 55 ends the device-side storage process.

As described above, in the relay device 30, the control unit 55 stores, in the temporary storage unit 52, the data frames received by the two CAN communication units 50a and 50b and the four Ethernet communication units 51a and 51b. When one of the four Ethernet communication units 51a and 51b receives a data frame, the control unit 55 stores the reception time data indicating: the device as a transmission source of the data frame; and the date and time when the data frame is received. A region where data frames for Ethernet are stored and a region where data frames for CAN are stored are provided in the temporary storage unit 52. The data frames for Ethernet are received by the four Ethernet communication units 51a and 51b. The data frames for CAN are received by the two CAN communication units 50a and 50b.

Figure 8:
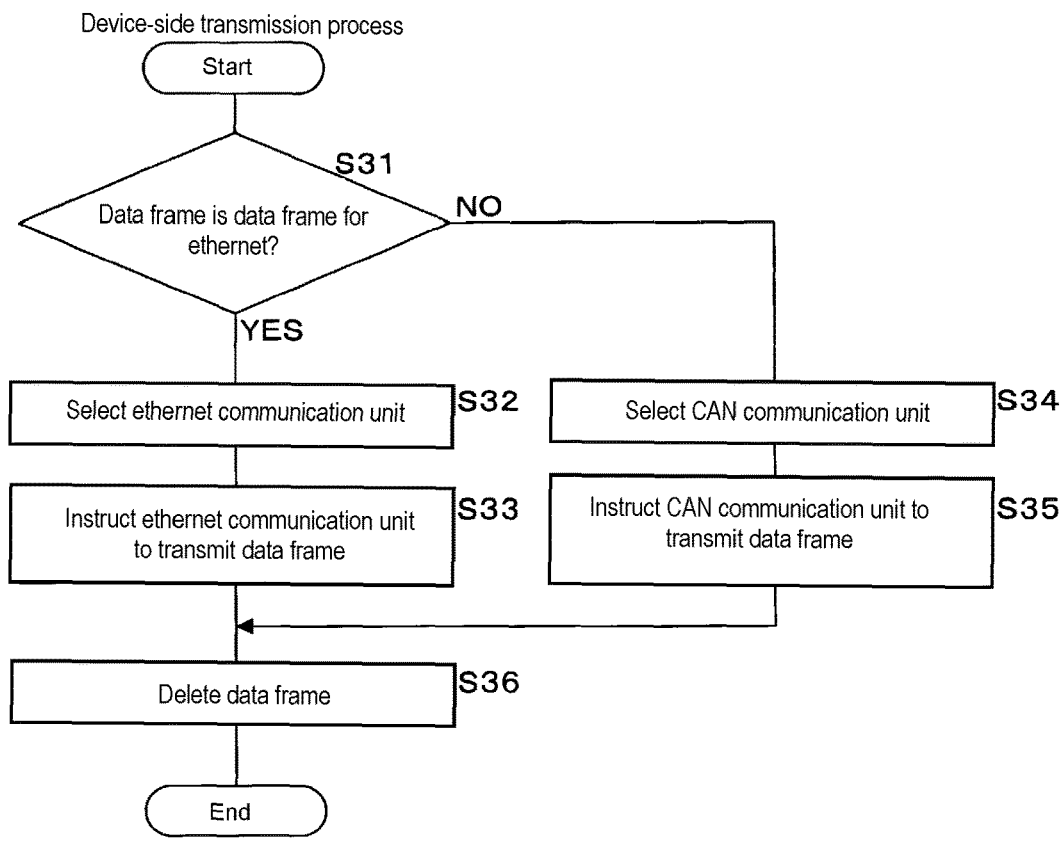
FIG. 8 is a flowchart showing the procedure of a device-side transmission process.

FIG. 8 is a flowchart showing the procedure of the device-side transmission process. The control unit 55 performs the device-side transmission process when the data frame is stored in the temporary storage unit 52. The control unit 55 determines whether or not the data frame to be transmitted is a data frame for Ethernet, the data frame to be transmitted being stored in the temporary storage unit 52 (step S31). The fact that the data frame to be transmitted is not a data frame for Ethernet means that the data frame to be transmitted is a data frame for CAN.

When it is determined that the data frame to be transmitted is a data frame for Ethernet (S31: YES), the control unit 55 selects an Ethernet communication unit connected to the device as a transmission destination among the four Ethernet communication units 51a and 51b (step S32). The device as a transmission destination is indicated by the transmission destination data of the data frame to be transmitted. Then, the control unit 55 instructs the Ethernet communication unit selected in step S32 to transmit the data frame to be transmitted (step S33). As a result, the Ethernet communication unit selected in step S32 transmits the data frame to be transmitted to one of the four high-performance ECUs 10 and 20 through one of the communication lines 13 and 23.

Each of the Ethernet communication units 51a and 51b functions as a first transmission unit.

When it is determined that the data frame to be transmitted is not a data frame for Ethernet (S31: NO), the control unit 55 selects a CAN communication unit among the two CAN communication units 50a and 50b based on the identification data of the data frame to be transmitted (step S34). Then, the control unit 55 instructs the CAN communication unit selected in step S34 to transmit the data frame to be transmitted (step S35). As a result, the CAN communication unit selected in step S34 transmits the data frame to be transmitted through one of the communication buses 12 and 22.

After executing one of steps S33 and S35, the control unit 55 deletes, from the temporary storage unit 52, the data frame to be transmitted, which has been transmitted by one of the two CAN communication units 50a and 50b and the four Ethernet communication units 51a and 51b (step S36). Then, the control unit 55 ends the device-side transmission process. The control unit 55 functions as a deletion unit.

As described above, in the relay device 30, the two CAN communication units 50a and 50b and the four Ethernet communication units 51a and 51b transmit the data frame stored in the temporary storage unit 52. The control unit 55 deletes the transmitted data frame from the temporary storage unit 52. As described above, when the two CAN communication units 50a and 50b and the four Ethernet communication units 51a and 51b receive the data frame, the data frame is stored in the temporary storage unit 52. The amount of data stored in the temporary storage unit 52 changes according to the amount of data stored in the temporary storage unit 52 per unit time and according to the amount of data transmitted per unit time.

Figure 9:
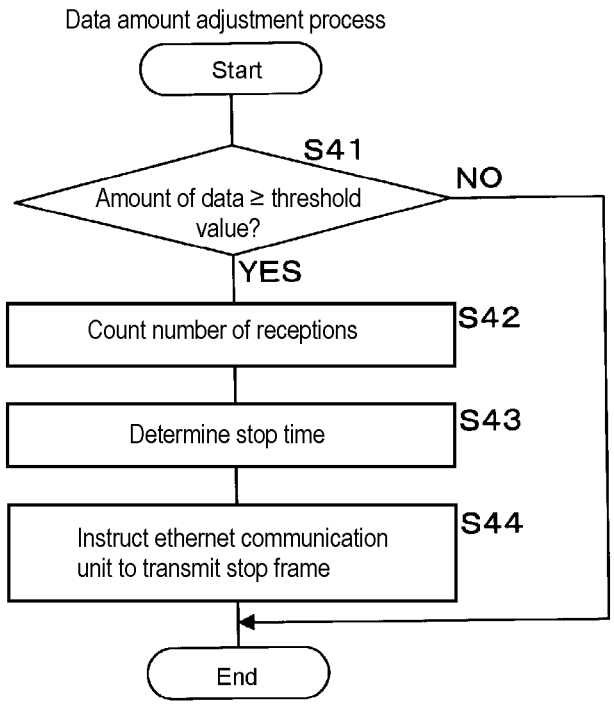
FIG. 9 is a flowchart showing the procedure of a data amount adjustment process.

FIG. 9 is a flowchart showing the procedure of a data amount adjustment process. Here, the data amount adjustment process relevant to one high-performance ECU 10 will be described. The control unit 55 cyclically performs the data amount adjustment process. In the data amount adjustment process, the control unit 55 determines, for data relevant to the data frame received from the target high-performance ECU 10, whether or not the amount of data stored in the temporary storage unit 52 is equal to or greater than a threshold value (step S41). The threshold value is fixed, and is set in advance. The control unit 55 also functions as a data amount determination unit. The target high-performance ECU 10 is one high-performance ECU 10 relevant to the data amount adjustment process.

When it is determined that the amount of data is equal to or greater than the threshold value (S41: YES), the control unit 55 counts the number of receptions by which the Ethernet communication unit 51a has received the data frame from the target high-performance ECU 10 through the communication line 13 within the reference time (step S42).

Figure 10:
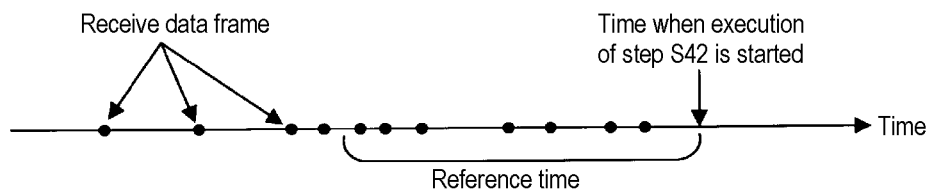
FIG. 10 is an explanatory diagram of the number of receptions relevant to a high-performance ECU.

FIG. 10 is an explanatory diagram of the number of receptions relevant to the high-performance ECU 10. In FIG. 10, on the time axis, a point in time (date and time) when the Ethernet communication unit 51a receives a data frame from the target high-performance ECU 10 is shown by a black circle. The number of receptions is the number of times by which data frames are received from the target high-performance ECU 10 during a period from the time traced back by the reference time from the start of the execution of step S42 to the time when the execution of step S42 is started. In the example of FIG. 10, the number of receptions is 7. In step S42, the number of receptions is counted based on a plurality of reception time data stored in the temporary storage unit 52.

Then, the control unit 55 determines a stop time for the target high-performance ECU 10 based on the number of receptions counted in step S42 (step S43). The relationship between the candidate time and the number of receptions is stored in advance in the main storage unit 54. The candidate time is a candidate for the stop time. In step S43, the control unit 55 determines the stop time based on the stored relationship.

Figure 11:
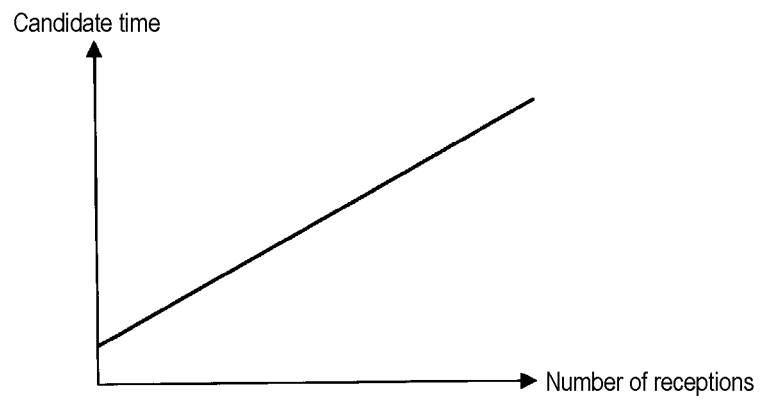
FIG. 11 is a graph showing the relationship between the candidate time and the number of receptions.

FIG. 11 is a graph showing the relationship between the candidate time and the number of receptions. FIG. 11 shows a candidate time for the target high-performance ECU 10. The relationship shown in FIG. 11 is stored in advance in the main storage unit 54. As shown in FIG. 11, the candidate time becomes longer as the number of receptions becomes larger. In step S43, the control unit 55 determines the stop time so that the stop time becomes a candidate time corresponding to the number of receptions counted in step S42. The control unit 55 also functions as a determination unit.

Then, the control unit 55 instructs the Ethernet communication unit 51a connected to the target high-performance ECU 10 to transmit the stop frame (step S44). Here, the stop time indicated by the stop time data of the stop frame is the stop time determined in step S43. The control unit 55 executes step S44 so that the Ethernet communication unit 51a transmits the stop frame to the target high-performance ECU 10.

As a result, the target high-performance ECU 10 stops transmission through the communication line 13 until the stop time indicated by the stop time data of the stop frame passes from the reception of the stop frame. During this time, the target high-performance ECU 10 transmits, through the communication bus 12, transmission data, the transmission destination of which is one of the three high-performance ECUs 10 and 20 excluding its own device.

When it is determined that the amount of data is less than the threshold value (S41: NO) or after executing step S44, the control unit 55 ends the data amount adjustment process.

The control unit 55 performs each of the three data amount adjustment processes relevant to the remaining three high-performance ECUs 10 and 20 in the similar manner as the data amount adjustment process described with reference to FIGS. 9 to 11. In the description of the data amount adjustment process relevant to the high-performance ECU 10, the high-performance ECUs 10 and 20 and the Ethernet communication unit 51a are replaced with the high-performance ECUs 20 and 10 and the Ethernet communication unit 51b, respectively. In this manner, it is possible to understand the data amount adjustment process relevant to the high-performance ECU 20.

The control unit 55 performs four data amount adjustment processes. Therefore, it is assumed that the control unit 55 determines that, for the data frame received from at least one of the four high-performance ECUs 10 and 20, the amount of data relevant to the data frame stored in the temporary storage unit 52 is equal to or greater than the threshold value. In this case, one of the four Ethernet communication units 51a and 51b transmits a stop frame to the high-performance ECU that is a transmission source of data for which it has been determined that the amount of data is equal to or greater than the threshold value. The whole of the four Ethernet communication units 51a and 51b functions as a second transmission unit.

Two of the four threshold values for the four data amount adjustment processes, that is, for a plurality of data frames received respectively from the four high-performance ECUs 10 and 20, are different from each other. Therefore, all of the threshold values for the four data amount adjustment processes are not the same and are appropriately set separately. In addition, for all of the four high-performance ECUs 10 and 20, the relationship between the candidate time and the number of receptions is not the same.

FIG. 12 is an explanatory diagram of the candidate time for the high-performance ECUs 10 and 20. In FIG. 12, two straight lines L1 and L2 showing the relationship between the number of receptions and the candidate time are shown. As shown in FIG. 12, for each of the straight lines L1 and L2, the larger the number of receptions, the longer the candidate time. For the same number of receptions, the candidate time of the straight line L1 is longer than the candidate time of the straight line L2. The slope of the straight line L1 is larger than the slope of the straight line L2.

For example, in step S43 of the two data amount adjustment processes relevant to one high-performance ECU 10 and one high-performance ECU 20, the control unit 55 determines the stop time based on the relationship shown by the straight line L1. In step S43 of the two data amount adjustment processes relevant to the other high-performance ECU 10 and the other high-performance ECU 20, the control unit 55 determines the stop time based on the relationship shown by the straight line L2.

In the relay device 30, when the control unit 55 determines that, for the data transmitted by one of the four high-performance ECUs 10 and 20, the data stored in the temporary storage unit 52 is equal to or greater than the threshold value, a stop frame is transmitted to the high-performance ECU that transmits the data, the amount of which is equal to or greater than the threshold value. Therefore, the high-performance ECU that transmits a large amount of data stops transmission through one of the communication lines 13 and 23, and transmits a data frame through one of the communication buses 12 and 22. As a result, the transmission of data in a short time is realized. Data frames are efficiently transmitted.

In addition, the control unit 55 appropriately determines the stop time indicated by the stop time data of the stop frame, based on the number of receptions. The stop time indicated by the stop time data of the stop frame is the stop time during which each of the four high-performance ECUs 10 and 20 stops transmission through one of the communication lines 13 and 23.

The four threshold values for the four data amount adjustment processes may be the same.

Embodiment 2

In Embodiment 1, the control unit 55 of the relay device 30 determines whether or not the amount of data is equal to or greater than the threshold value for each of the plurality of data frames received from the four high-performance ECUs 10 and 20. However, the data frame relevant to the determination regarding whether or not the amount of data is equal to or greater than the threshold value is not limited to the data frame classified by the device as a transmission source. Hereinafter, the differences between Embodiments 1 and 2 will be described. Other configurations excluding the configuration described below are similar to those in Embodiment 1. Therefore, the similar components as in Embodiment 1 are denoted by the same reference numerals as in Embodiment 1, and the description thereof will be omitted.

FIG. 13 is a chart showing an example of the relationship between data and a device for transmitting the data in Embodiment 2. In the communication system N according to Embodiment 2, in one of the four high-performance ECUs 10 and 20, the control unit 45 performs a process by executing the first application program. In another high-performance ECU, the control unit 45 performs a process by executing the second application program.

In FIG. 13, the data used in the process according to the first application program is described as first application data. The data used in the process according to the second application program is described as second application data.

In the example of FIG. 13, the Ethernet communication unit 41 of each of the two high-performance ECUs 10 transmits a data frame including the first application data as main data through the communication line 13 connected to its own device. The Ethernet communication unit 41 of each of the two high-performance ECUs 20 transmits a data frame including the second application data as main data through the communication line 23.

The type of data is determined by the application program relevant to the process using the data. Each of the first application data and the second application data is one type of data. The four Ethernet communication units 51a and 51b of the relay device 30 receive two types of data from the four high-performance ECUs 10 and 20 through the four communication lines 13 and 23. In the device-side storage process, the control unit 55 stores, in the temporary storage unit 52, two types of data received by the four Ethernet communication units 51a and 51b through the four communication lines 13 and 23. The control unit 55 performs a data amount adjustment process for each of the two types of data, that is, for each of the first application data and the second application data.

FIG. 14 is a flowchart showing the procedure of the data amount adjustment process. Here, the data amount adjustment process relevant to the first application data will be described. The control unit 55 cyclically performs the data amount adjustment process relevant to the first application data. In the data amount adjustment process, the control unit 55 determines, for data relevant to the data frame including the first application data, whether or not the amount of data stored in the temporary storage unit 52 is equal to or greater than the threshold value (step S51). The threshold value is fixed and is set in advance as in Embodiment 1.

When it is determined that the amount of data is equal to or greater than the threshold value (S51: YES), the control unit 55 counts the number of receptions by which the four high-performance ECUs 10 and 20 have received the data frame including the first application data within the reference time (step S52). In the example of FIG. 13, the two high-performance ECUs 10 receive the first application data.

FIG. 15 is an explanatory diagram of the number of receptions relevant to the first application data. In FIG. 15, on the time axis, a point in time (date and time) when the four Ethernet communication units 51a and 51b receive a data frame including the first application data is shown by a black circle. The number of receptions is the number of times of reception by the four Ethernet communication units 51a and 51b during a period from the time traced back by the reference time from the start of the execution of step S52 to the time when the execution of step S52 is started. In the example of FIG. 15, the number of receptions is 7. In step S52, the number of receptions is counted based on a plurality of reception time data stored in the temporary storage unit 52 and the relationship shown in FIG. 13.

In step S24 of the device-side storage process, the control unit 55 may store, in the temporary storage unit 52, reception time data indicating the type of data in addition to the device as a transmission source and the date and time. In this configuration, even when a high-performance ECU that transmits a data frame including the first application data and a data frame including the second application data is included in the four high-performance ECUs 10 and 20, the control unit 55 can count the number of receptions.

Then, the control unit 55 determines a stop time relevant to the first application data based on the number of receptions counted in step S52 (step S53). The relationship between the candidate time and the number of receptions for the first application data is stored in advance in the main storage unit 54. In step S53, the control unit 55 determines the stop time so that the stop time becomes the candidate time of the first application data corresponding to the number of receptions counted in step S52.

Then, the control unit 55 instructs one or more Ethernet communication units to transmit the stop frame one or more Ethernet communication units being included in the four Ethernet communication units 51a and 51b and being connected respectively to one or more transmission sources of the data frame including the first application data (step S54). The stop time indicated by the stop time data of the stop frame is the stop time determined in step S53. The control unit 55 executes step S54 so that one or more Ethernet communication units transmit the stop frame to one or more high-performance ECUs that are included in the four high-performance ECUs 10 and 20 and that are transmission sources of data frames including the first application data.

As a result, the high-performance ECU 10 that is a transmission source of the data frame including the first application data stops transmission through the communication line 13 until the stop time indicated by the stop time data of the stop frame passes from the reception of the stop frame. During this time, the target high-performance ECU 10 transmits, through the communication bus 12, a data frame including, as main data, transmission data, the transmission destination of which is one of the three high-performance ECUs 10 and 20 excluding its own device.

When it is determined that the amount of data is less than the threshold value (S51: NO) or after executing step S54, the control unit 55 ends the data amount adjustment process.

The control unit 55 performs the data amount adjustment process relevant to the second application data in the similar manner as the data amount adjustment process relevant to the first application data.

The control unit 55 performs the data amount adjustment processes relevant to the first application data and the second application data. Therefore, it is assumed that the control unit 55 determines that, for at least one type of data among the first application data and the second application data, the amount of data stored in the temporary storage unit 52 is equal to or greater than the threshold value. In this case, at least one of the four Ethernet communication units 51a and 51b transmits a stop frame to the high-performance ECU that is a transmission source of data, for which it has been determined that the amount of data is equal to or greater than the threshold value, in the first application data and the second application data.

The two threshold values for the two data amount adjustment processes, that is, the two threshold values for the first application data and the second application data are different from each other. Therefore, the two threshold values for the two data amount adjustment processes are not the same and are appropriately set separately. In addition, for the relationship between the candidate time and the number of receptions, the relationships for the first application data and the second application data are not same.

Figure 16:
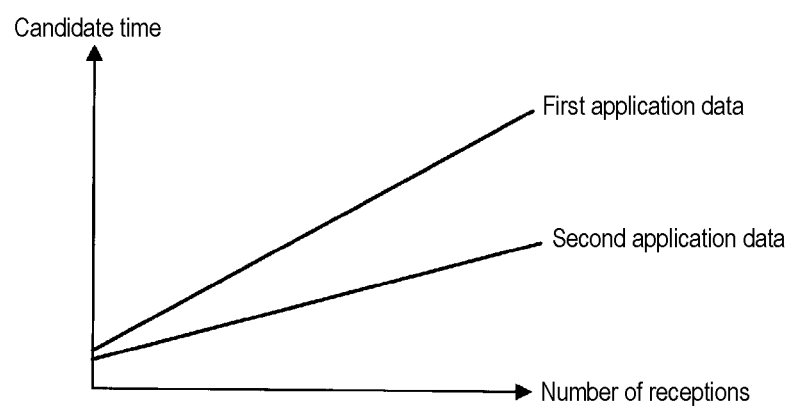
FIG. 16 is an explanatory diagram of the candidate time relevant to first application data and second application data.

FIG. 16 is an explanatory diagram of the candidate time relevant to the first application data and the second application data. FIG. 16 shows the relationship between the number of receptions and the candidate time for each of the first application data and the second application data. As shown in FIG. 16, for each of the first application data and the second application data, the larger the number of receptions, the longer the candidate time. For the same number of receptions, the candidate time relevant to the first application data is longer than the candidate time relevant to the second application data. The slope of the straight line showing the relationship relevant to the first application data is larger than the slope of the straight line showing the relationship relevant to the second application data.

In the relay device 30, for one type of data, when the amount of data stored in the temporary storage unit 52 is large, a stop frame is transmitted to the high-performance ECU that is a transmission source of this type of data among the four high-performance ECUs 10 and 20. Therefore, the high-performance ECU that transmits a type of data, the amount of which is large, among the four high-performance ECUs 10 and 20, stops transmission through the communication lines 13 or 23 and performs transmission through the communication buses 12 or 22. As a result, the transmission of data in a short time is realized. Data frames are efficiently transmitted.

In addition, the control unit 55 appropriately determines the stop time indicated by the stop time data of the stop frame based on the number of receptions. The stop time indicated by the stop time data of the stop frame is the stop time during which each of the four high-performance ECUs 10 and 20 stops transmission through one of the communication lines 10 and 20.

In Embodiment 2, the number of types of data is not limited to 2, and may be 3 or more. In this case, two of K (K is an integer of 3 or more) threshold values for K data amount adjustment processes, that is, for K types of data, are different from each other. The K threshold values are not the same and are appropriately set separately. Each of the K application programs is executed by one of the four high-performance ECUs 10 and 20. The threshold values for all types of data may be the same.

One of the four high-performance ECUs 10 and 20 may transmit a data frame including a plurality of types of data. In this case, the relay device 30 may transmit, to the high-performance ECU that transmits a plurality of types of data, a stop frame which indicates the type of data, transmission of which is stopped. For example, it is assumed that the high-performance ECU 10 is configured to transmit the first application data and the second application data. The Ethernet communication unit 51a of the relay device 30 transmits a stop frame indicating the first application data to the high-performance ECU 10. For the first application data, the high-performance ECU 10 stops transmission through the communication line 13 and performs transmission through the communication bus 12. For the second application data, the high-performance ECU 10 continues the transmission through the communication line 13.

In Embodiments 1 and 2, the number of high-performance ECUs 10 and the number of high-performance ECUs 20 are not limited to 2, and may be 1 or 3 or more. The total number of high-performance ECUs 10 and 20 is not limited to 4, and may be 2, 3 or 5 or more. The number of communication lines 13 is the same as the number of high-performance ECUs 10. The number of communication lines 23 is the same as the number of high-performance ECUs 20. The number of first communication paths is the same as the total number of communication lines 13 and 23.

When the relay device 30 receives the data frame for CAN through one of the two communication buses 12 and 22, the relay device 30 may generate a data frame for Ethernet including the main data of the received data frame. The relay device 30 may transmit the generated data frame through one of the four communication lines 13 and 23. When the relay device 30 receives the data frame for Ethernet through one of the four communication lines 13 and 23, the relay device 30 may generate a data frame for CAN including the main data of the received data frame. The relay device 30 may transmit the generated data frame through one of the two communication buses 12 and 22.

The protocol used for communication through each of the communication buses 12 and 22 is not limited to the protocol for CAN. Any protocol that can be used on the communication bus may be used. Similarly, the protocol used for communication through each of the communication lines 13 and 23 is not limited to the protocol for Ethernet, and may be another protocol.

The stop time may be a fixed time that does not change according to the number of receptions. The time measurement for determining whether or not the stop time has passed may be performed by the relay device 30 instead of the high-performance ECUs 10 and 20. In this case, the relay device 30 transmits a stop frame and a resume frame to the high-performance ECU 10 or 20. For the stop frame, stop time data is removed. The resume frame gives an instruction to resume communication through one of the communication lines 13 and 23. When each of the high-performance ECUs 10 and 20 receives the stop frame, each of the high-performance ECUs 10 and 20 stops the transmission through one of the communication lines 13 and 23. Furthermore, each of the high-performance ECUs 10 and 20 transmits, through one of the communication buses 12 and 22, main data, transmission destination of which is one of the three high-performance ECUs 10 and 20 excluding its own device. When each of the high-performance ECUs 10 and 20 receives the resume frame, each of the high-performance ECUs 10 and 20 resumes the transmission through one of the communication lines 13 and 23. The number of communication buses connected to the relay device 30 is not limited to 2, and may be 3 or more.

It should be considered that Embodiments 1 and 2 disclosed are examples in all points and not restrictive. The scope of the present disclosure is defined by the claims rather than the meanings set forth above, and is intended to include all modifications within the scope and meaning equivalent to the claims.

The invention claimed is:

1. A relay device for receiving data from a communication device through a first communication path or a second communication path and for transmitting the received data, comprising:
    a storage unit in communication with the first communication path is stored;
    a first transmission unit;
    a deletion unit;
    a data amount determination unit;
    a second transmission unit that transmits an instruction data; and
    a control unit having a processor and a non-transitory, machine-readable medium storing instructions which, when executed by at least one programmable processor causes the control unit perform the following operations:
        store the data received in the storage unit;
        transmit the data stored in the storage unit;
        cause the deletion unit to delete the data transmitted by the first transmission unit from the storage unit;
        cause the data amount determination unit to determine, for the data received through the first communication path, whether or not an amount of data stored in the storage unit is equal to or greater than a threshold value; and
        cause the second transmission unit to transmit the instruction data to the communication device, the instruction data giving an instruction to stop transmission through the first communication path and to perform transmission through the second communication path, when the data amount determination unit determines that the amount of data is equal to or greater than the threshold value.

2. The relay device according to claim 1, further comprising:
    a determination unit that determines a stop time, during which the transmission through the first communication path is stopped, based on the number of receptions of data through the first communication path within a predetermined period,
    wherein the instruction data includes data indicating the stop time determined by the determination unit.

3. The relay device according to claim 2,
    wherein the number of communication devices is two or more,
    data is received from a plurality of the communication devices through a plurality of the first communication paths,
    a plurality of data received from the plurality of communication devices are stored in the storage unit,
    the data amount determination unit determines, for each of the plurality of data received respectively from the plurality of communication devices, whether or not the amount of data stored in the storage unit is equal to or greater than a threshold value, and
    when the data amount determination unit determines that the amount of data is equal to or greater than the threshold value for data received from at least one of the plurality of communication devices, the second transmission unit transmits the instruction data to the communication device that is a transmission source of data for which it has been determined that the amount of data is equal to or greater than the threshold value.

4. The relay device according to claim 2,
    wherein the number of communication devices is two or more,
    a plurality of types of data are received from a plurality of the communication devices through a plurality of the first communication paths,
    the plurality of types of data received through the plurality of first communication paths are stored in the storage unit,
    the data amount determination unit determines, for each of the plurality of types of data, whether or not the amount of data stored in the storage unit is equal to or greater than a threshold value, and
    when the data amount determination unit determines that the amount of data is equal to or greater than the threshold value for at least one type of data among the plurality of types of data, the second transmission unit transmits the instruction data to the communication device that is a transmission source of data for which it has been determined that the amount of data is equal to or greater than the threshold value.

5. The relay device according to claim 2,
wherein the second communication path is a path along which data is transmitted through a communication bus, and
a protocol used for communication through the first communication path is different from a protocol used for communication through the second communication path.

6. The relay device according to claim 1,
wherein the number of communication devices is two or more,
data is received from a plurality of the communication devices through a plurality of the first communication paths,
a plurality of data received from the plurality of communication devices are stored in the storage unit,
the data amount determination unit determines, for each of the plurality of data received respectively from the plurality of communication devices, whether or not the amount of data stored in the storage unit is equal to or greater than a threshold value, and
when the data amount determination unit determines that the amount of data is equal to or greater than the threshold value for data received from at least one of the plurality of communication devices, the second transmission unit transmits the instruction data to the communication device that is a transmission source of data for which it has been determined that the amount of data is equal to or greater than the threshold value.

7. The relay device according to claim 6, wherein two of a plurality of threshold values for the plurality of data received respectively from the plurality of communication devices are different from each other.

8. The relay device according to claim 7,
wherein the second communication path is a path along which data is transmitted through a communication bus, and
a protocol used for communication through the first communication path is different from a protocol used for communication through the second communication path.

9. The relay device according to claim 6,
wherein the second communication path is a path along which data is transmitted through a communication bus, and
a protocol used for communication through the first communication path is different from a protocol used for communication through the second communication path.

10. The relay device according to claim 1,
wherein the number of communication devices is two or more,
a plurality of types of data are received from a plurality of the communication devices through a plurality of the first communication paths,
the plurality of types of data received through the plurality of first communication paths are stored in the storage unit,
the data amount determination unit determines, for each of the plurality of types of data, whether or not the amount of data stored in the storage unit is equal to or greater than a threshold value, and
when the data amount determination unit determines that the amount of data is equal to or greater than the threshold value for at least one type of data among the plurality of types of data, the second transmission unit transmits the instruction data to the communication device that is a transmission source of data for which it has been determined that the amount of data is equal to or greater than the threshold value.

11. The relay device according to claim 10, wherein the type of data is determined by an application program using the data.

12. The relay device according to claim 11, wherein two of a plurality of threshold values for the plurality of types of data are different from each other.

13. The relay device according to claim 11,
wherein the second communication path is a path along which data is transmitted through a communication bus, and
a protocol used for communication through the first communication path is different from a protocol used for communication through the second communication path.

14. The relay device according to claim 10, wherein two of a plurality of threshold values for the plurality of types of data are different from each other.

15. The relay device according to claim 14,
wherein the second communication path is a path along which data is transmitted through a communication bus, and
a protocol used for communication through the first communication path is different from a protocol used for communication through the second communication path.

16. The relay device according to claim 10,
wherein the second communication path is a path along which data is transmitted through a communication bus, and
a protocol used for communication through the first communication path is different from a protocol used for communication through the second communication path.

17. The relay device according to claim 1,
wherein the second communication path is a path along which data is transmitted through a communication bus, and
a protocol used for communication through the first communication path is different from a protocol used for communication through the second communication path.

18. A relay method, comprising:
storing, in a storage unit, data which is received from a communication device through a first communication path;
transmitting the data stored in the storage unit;
deleting the transmitted data from the storage unit;
determining, for the data received through the first communication path, whether or not an amount of data stored in the storage unit is equal to or greater than a threshold value; and
transmitting, to the communication device, instruction data which gives an instruction to stop transmission through the first communication path and to perform transmission through a second communication path different from the first communication path, when it is determined that the amount of data is equal to or greater than the threshold value.

19. A non-transitory computer-readable medium encoded with a computer program causing the non-transitory computer-readable medium to execute:
storing, in a storage unit, data which is received from a communication device through a first communication path;

giving an instruction to transmit the data stored in the storage unit;
deleting the transmitted data from the storage unit;
determining, for the data received through the first communication path, whether or not an amount of data stored in the storage unit is equal to or greater than a threshold value; and
giving an instruction to transmit, to the communication device, instruction data which gives an instruction to stop transmission through the first communication path and to perform transmission through a second communication path different from the first communication path, when it is determined that the amount of data is equal to or greater than the threshold value.

* * * * *